United States Patent
Matsumoto et al.

(10) Patent No.: US 8,146,809 B2
(45) Date of Patent: Apr. 3, 2012

(54) AUTHENTICATION SYSTEM AND TERMINAL HAVING FUNCTION OF SETTING IDENTIFICATION INFORMATION READING METHOD

(75) Inventors: Ritsuko Matsumoto, Osaka (JP); Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 282 days.

(21) Appl. No.: 12/495,097

(22) Filed: Jun. 30, 2009

(65) Prior Publication Data

US 2010/0001066 A1  Jan. 7, 2010

(30) Foreign Application Priority Data

Jul. 3, 2008  (JP) ................................. 2008-174828

(51) Int. Cl.
G06K 5/00 (2006.01)
G06K 7/01 (2006.01)

(52) U.S. Cl. ........ 235/380; 235/375; 235/381; 235/382; 235/382.5; 235/383; 235/451; 235/492

(58) Field of Classification Search ................. 235/375, 235/380–383, 451, 492
See application file for complete search history.

(56) References Cited

U.S. PATENT DOCUMENTS

| | | | | |
|---|---|---|---|---|
| 5,633,932 A | * | 5/1997 | Davis et al. | 713/176 |
| 5,638,511 A | * | 6/1997 | Nezu | 726/5 |
| 6,378,070 B1 | * | 4/2002 | Chan et al. | 713/155 |
| 2002/0016921 A1 | * | 2/2002 | Olsen et al. | 713/200 |
| 2005/0154739 A1 | * | 7/2005 | Ikai et al. | 707/10 |
| 2005/0281405 A1 | * | 12/2005 | Uchikawa et al. | 380/51 |
| 2006/0053481 A1 | * | 3/2006 | Olsen et al. | 726/3 |

FOREIGN PATENT DOCUMENTS

| | | |
|---|---|---|
| JP | 6-119501 | 4/1994 |
| JP | 2002-351274 | 12/2002 |

* cited by examiner

*Primary Examiner* — Tuyen K Vo
(74) *Attorney, Agent, or Firm* — David G. Conlin; Steven M. Jensen; Edwards Wildman Palmer LLP

(57) ABSTRACT

In order to provide an authentication system and a terminal capable of saving user's trouble and allowing quick and accurate determination as to whether the user is a registered user or not, a data processing device capable of data communication with a plurality of image forming apparatuses decides an IC card standard used by an IC card reader connected to each image forming apparatus, and transmits a signal notifying the standard to the image forming apparatus having a corresponding identification ID. Based on the IC card standard decided by the data processing device, the image forming apparatus sets the IC card standard used by the IC card reader and determines whether or not the user is a registered user.

21 Claims, 7 Drawing Sheets

AUTHENTICATION SYSTEM AND TERMINAL HAVING FUNCTION OF SETTING IDENTIFICATION INFORMATION READING METHOD

CROSS-REFERENCE TO RELATED APPLICATION

This nonprovisional application claims priority under 35 U.S.C. §119(a) on Patent Application No. 2008-174828 filed in Japan on Jul. 3, 2008, the entire contents of which are hereby incorporated by reference.

BACKGROUND OF THE INVENTION

1. Field of the Invention

The present invention relates to an authentication system and a terminal for determining whether a user is a registered user or not and, more specifically, to an authentication system and a terminal making the determination based on a set identification information reading method.

2. Description of the Background Art

Some image forming apparatuses such as copy machines and printers are provided with a record management device for performing user authentication to limit users and performing budget management and resource management by keeping track of use of the image forming apparatuses. The record management device as such generally includes an identification information reading device for reading identification information for identifying a user. Assume, for example, that a card reader is used as the identification information reading device. In that case, when a card having magnetically or optically recorded identification information thereon is put in the card reader, the record management device performs user authentication based on the identification information read from the card. Then, based on the result, it controls operations of the image forming apparatus and counts the number of printed sheets and the like department by department, or process by process such as color/black-and-white mode, paper size or double-sided/single-sided mode.

By way of example, Japanese Patent Laying-Open No. 2002-351274 (hereinafter denoted as "'274 reference") discloses a record management device including a card reader capable of reading two different types of codes including a first authentication code corresponding to the image recording apparatus as an object of management, and a second authentication code corresponding to a plurality of image recording apparatuses.

According to the technique disclosed in '274 reference, it is necessary to store the first and second authentication codes in the record management device in advance, to perform the user authentication process. Specifically, in the conventionally used record management device, at the time of initial operation or when a card used for user authentication is changed, a user represented by an administrator must each time decide and set the method of reading identification information to be used for the user authentication process. It is troublesome and imposes much burden on the user. Further, if there is a mistake in setting by the user, quick and accurate user authentication becomes impossible.

SUMMARY OF THE INVENTION

An object of the present invention is to provide an authentication system and a terminal that can accurately and quickly determine whether or not a user is a registered user, while saving user's trouble.

According to an aspect, the present invention provides an authentication system including a plurality of terminals including an identification information reading device reading identification information for identifying a registered user, and a data processing device performing data communication with the plurality of terminals through a network; wherein the terminal includes first storage storing in advance an identification ID unique to the terminal, an identification information reading method supported by the identification information reading device, and limiting information for limiting the registered user from among users, related to each other as first data, a first transmitting device transmitting the first data to the data processing device, a first receiving device receiving a signal indicating an identification information reading method used by the identification information reading device, from the data processing device, a setting device setting an identification information reading method used by the identification information reading device, based on the indicated identification information reading method, a determining device determining whether or not a user is the registered user, based on whether or not the identification information can be read by the set identification information reading method, and a controller controlling an operation of the terminal based on the result of determination. The data processing device includes second storage storing in advance the limiting information and an identification information reading method usable only by the registered user, related to each other as second data, a second receiving device receiving the first data transmitted from the terminal, a deciding device deciding an identification information reading method used by the identification information reading device based on the received first data and the second data, and a second transmitting device transmitting a signal indicating the decided identification information reading method to the terminal having the corresponding identification ID.

As described above, the data processing device capable of data communication with a plurality of terminals decides the identification information reading method used by the identification information reading device included in each terminal, and transmits a signal indicating the method to the terminal having the corresponding identification ID. Based on the identification information reading method decided by the data processing device, the terminal sets the identification information reading method used by the identification information reading device, and determines whether or not the user is a registered user. Therefore, it becomes unnecessary for an administrator or the like of the terminal to decide and set the identification information reading method used by the identification information reading device for every terminal. Therefore, the trouble required for determining whether or not the user is a registered user can be saved. Further, the identification information reading method is set automatically and, therefore, error in setting can be eliminated, and hence, determination as to whether the user is a registered user or not can be made quickly with high accuracy. Further, as the data processing device stores the second data that is required for deciding the identification information reading method used by the identification information reading device included in each terminal, it becomes unnecessary to store in advance the second data in each terminal. Therefore, the load necessary for the storage process in each terminal can be reduced. In addition, changes to all terminals can be made by one change of the second data and, therefore, it is possible to further save the user's trouble.

Further, the data processing device decides the identification information reading method used by the identification information reading device based on the first data, which is stored in advance, having the identification ID unique to each terminal, the identification information reading method supported by the identification information reading device, and the limiting information for limiting the registered user among the users related to each other, and the second data, which is stored in advance, having the limiting information and the identification information reading method usable only by the registered user related to each other. Therefore, the decision can be made quickly with high accuracy. As a result, it becomes possible to quickly and accurately determine whether or not the user is a registered user.

Preferably, the first transmitting device transmits the first data to the data processing device when the terminal is activated. Therefore, even when at least the first data or the second data is changed, the identification information reading method used by the identification information reading device can be decided accurately and, therefore, the determination as to whether the user is a registered user or not can always be done accurately. Further, even when at least the first data or the second data is changed, it is unnecessary for the administrator or the like of the terminal device to decide and set the identification information reading method to be used by the identification information reading device terminal by terminal. Therefore, it becomes possible to further save the trouble required to determine whether or not the user is a registered user.

More preferably, the identification information reading device is an IC (Integrated Circuit) card reader reading identification information for identifying a registered user from an IC card; the first storage includes a first storage unit storing in advance an identification ID unique to the terminal, an IC card standard supported by the IC card reader, and limiting information for limiting the registered user from among users, related to each other as first data; the first receiving device includes a receiving unit receiving a signal indicating an IC card standard used by the IC card reader, from the data processing device; the setting device includes a setting unit setting the IC card standard used by the IC card reader, based on the indicated IC card standard; the determining device includes a determining unit determining whether or not a user is the registered user, based on whether the identification information can be read by the set IC card standard; the second storage includes a second storage unit storing in advance the limiting information and an IC card standard usable by an IC card held only by the registered user related to each other as second data; the deciding device includes a deciding unit deciding the IC card standard used by the IC card reader, based on the received first data and the second data; and the second transmitting device includes a transmitting unit transmitting a signal indicating the decided IC card standard to the terminal having the corresponding identification ID.

As described above, the data processing device capable of data communication with the plurality of terminals decides the IC card standard used by the IC card reader included in each terminal, and transmits a signal indicating the method to the terminal having the corresponding identification ID. Based on the IC card standard decided by the data processing device, the terminal sets the IC card standard used by the IC card reader and determines whether or not the user is a registered user. Therefore, it becomes unnecessary for an administrator or the like of the terminal to decide and set the IC card standard used by the IC card reader for every terminal. Therefore, the trouble required for determining whether or not the user is a registered user can be saved. Further, the IC card standard is set automatically and, therefore, error in setting can be eliminated, and hence, determination as to whether the user is a registered user or not can be made quickly with high accuracy. Further, as the data processing device stores the second data that is required for deciding the IC card standard used by the IC card reader included in each terminal, it becomes unnecessary to store in advance the second data in each terminal. Therefore, the load necessary for the storage process in each terminal can be reduced. In addition, changes to all terminals can be made by one change of the second data and, therefore, it is possible to further save the user's trouble.

Further, the data processing device decides the IC card standard used by the IC card reader, based on the first data, which is stored in advance, having the identification ID unique to each terminal, the IC card standard supported by the IC card reader, and the limiting information for limiting the registered user among the users related to each other, and the second data, which is stored in advance, having the limiting information and the IC card standard usable by the IC card held only by the registered user, related to each other. Therefore, the decision can be made quickly with high accuracy. As a result, it becomes possible to quickly and accurately determine whether or not the user is a registered user.

More preferably, the terminal further includes a first input device allowing a user to input a password. The first storage includes a storage unit storing in advance a password assigned only to the registered user. The determining device includes a determining unit determining whether or not a user is the registered user, based on whether or not the password stored in advance in the storage unit matches the password input through the first input device. As described above, determination as to whether the user is a registered user or not can be made not only by the identification information reading device but also by using a password. Therefore, even if determination by the identification information reading device becomes impossible because of some trouble, determination is still possible. Therefore, convenience for the user of the terminal can be improved.

More preferably, the determining unit determines, when the first transmitting device is incapable of transmitting the first data to the data processing device, or when the first receiving device does not receive the signal indicating the identification information reading method used by the identification information reading device from the data processing device, whether or not a user is a registered user based on whether or not the password stored in advance in the storage unit matches the password input through the first input device.

As described above, when transmission of the first data that is transmitted from the terminal to the data processing device is impossible, or when the signal indicating the identification information reading method used by the identification information reading device transmitted from the data processing device to the terminal is not received, whether or not the user is a registered user is determined using a password. Therefore, even when determination using the identification information reading device fails because of communication trouble or the like, determination is still possible, and therefore, convenience of the user using the terminal can be improved.

More preferably, the first input device includes an input unit allowing input of the first data; and the data processing device further includes a second input device for inputting the second data. This allows change to the first and second data. Therefore, even when the information stored in the first and second data should be changed as the identification information reading device is exchanged or the registered user is changed, it is possible to quickly and accurately decide the identification information reading method used by the identification information reading device. Therefore, determination as to whether the user is a registered user can be made more quickly with higher accuracy. Therefore, convenience for the user using the terminal can further be improved.

More preferably, the limiting information is site information indicating a site where the terminal is installed. Therefore, it becomes possible to change, site by site of installation of the terminal, the identification information reading method used for determining whether or not the user is a registered user. Therefore, it becomes possible to limit the users of the terminal site by site, for example, room by room or floor by floor. Therefore, a user is prevented from using a terminal installed outside the room or floor where use is permitted. This realizes accurate terminal management and higher security for the use of the terminal.

More preferably, the limiting information is group information indicating a group to which the terminal belongs. Therefore, it is possible to change, group by group to which the terminal belongs, the identification information reading method used for determining whether or not the user is a registered user. Therefore, the users of the terminal can be limited by the unit of a group, for example, limited to a department or the like. Therefore, a user is prevented from using a terminal that belongs to a group other than the group such as the department to which the user belongs. This realizes accurate terminal management and higher security for the use of the terminal.

More preferably, the terminal includes a mounting unit formed to allow attachment/detachment of third storage storing the identification information reading method indicated by the second transmitting device; and the setting device includes a setting unit setting, when the third storage is mounted on the mounting unit, the identification information reading method used by the identification information reading device, based on the identification information reading method stored in the third storage.

Accordingly, even in a situation in which communication between the terminal and the data processing device is impossible because of some trouble in communication, it is possible to determine whether or not the user is a registered user, when the registered user mounts the third storage to the terminal. Therefore, convenience for the user of the terminal can further be improved.

More preferably, the terminal further includes a display device for displaying information to be indicated to a user; and if it is determined by the determining device that the user is not a registered user, the display device displays that the user is not a registered user. Therefore, the user who is about to use the terminal readily recognizes that he/she is not a registered user. Therefore, convenience for the user of the terminal can further be improved.

According to another aspect, the present invention provides a terminal, including an identification information reading device reading identification information for identifying a registered user, and performing data communication with a data processing device deciding an identification information reading method used by the identification information reading device through a network, including: storage storing in advance an identification ID unique to the terminal, an identification information reading method supported by the identification information reading device, and limiting information for limiting the registered user from among users, related to each other as data; a transmitting device transmitting the data to the data processing device; a receiving device receiving a signal indicating an identification information reading method used by the identification information reading device, from the data processing device; a setting device setting an identification information reading method used by the identification information reading device, based on the indicated identification information reading method; a determining device determining whether or not a user is the registered user, based on whether or not the identification information can be read by the set identification information reading method; and a controller controlling an operation of the terminal based on the result of determination.

As described above, based on the identification information reading method decided by the data processing device, the terminal sets the identification information reading method to be used by the identification information reading device, and determines whether or not the user is a registered user. Therefore, it becomes unnecessary for an administrator or the like of the terminal to decide and set the identification information reading method used by the identification information reading device for every terminal. Therefore, the trouble required for determining whether or not the user is a registered user can be saved. Further, the identification information reading method is set automatically and, therefore, error in setting can be eliminated, and hence, determination as to whether the user is a registered user or not can be made quickly with high accuracy.

According to the present invention, the data processing device capable of data communication with the plurality of terminals decides the identification information reading method used by the identification information reading device included in each terminal, and transmits a signal indicating the method to the terminal having the corresponding identification ID. Based on the identification information reading method decided by the data processing device, the terminal sets the identification information reading method to be used by the identification information reading device, and determines whether or not the user is a registered user. Therefore, it becomes unnecessary for an administrator or the like of the terminal to decide and set the identification information reading method used by the identification information reading device for every terminal. Therefore, the trouble required for determining whether or not the user is a registered user can be saved. Further, the identification information reading method is set automatically and, therefore, error in setting can be eliminated, and hence, determination as to whether the user is a registered user or not can be made quickly with high accuracy. Further, as the data processing device stores the second data that is required for deciding the identification information reading method used by the identification information reading device included in each terminal, it becomes unnecessary to store in advance the second data in each terminal. Therefore, the load necessary for the storage process in each terminal can be reduced. In addition, changes to all terminals can be made by one change of the second data and, therefore, it is possible to further save the user's trouble.

Further, the data processing device decides the identification information reading method used by the identification information reading device based on the first data, which is stored in advance, having the identification ID unique to each terminal, the identification information reading method supported by the identification information reading device, and the limiting information for limiting the registered user among the users related to each other, and the second data, which is stored in advance, having the limiting information and the identification information reading method usable only by the registered user related to each other. Therefore, the decision can be made quickly with high accuracy. As a result, it becomes possible to quickly and accurately determine whether or not the user is a registered user.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
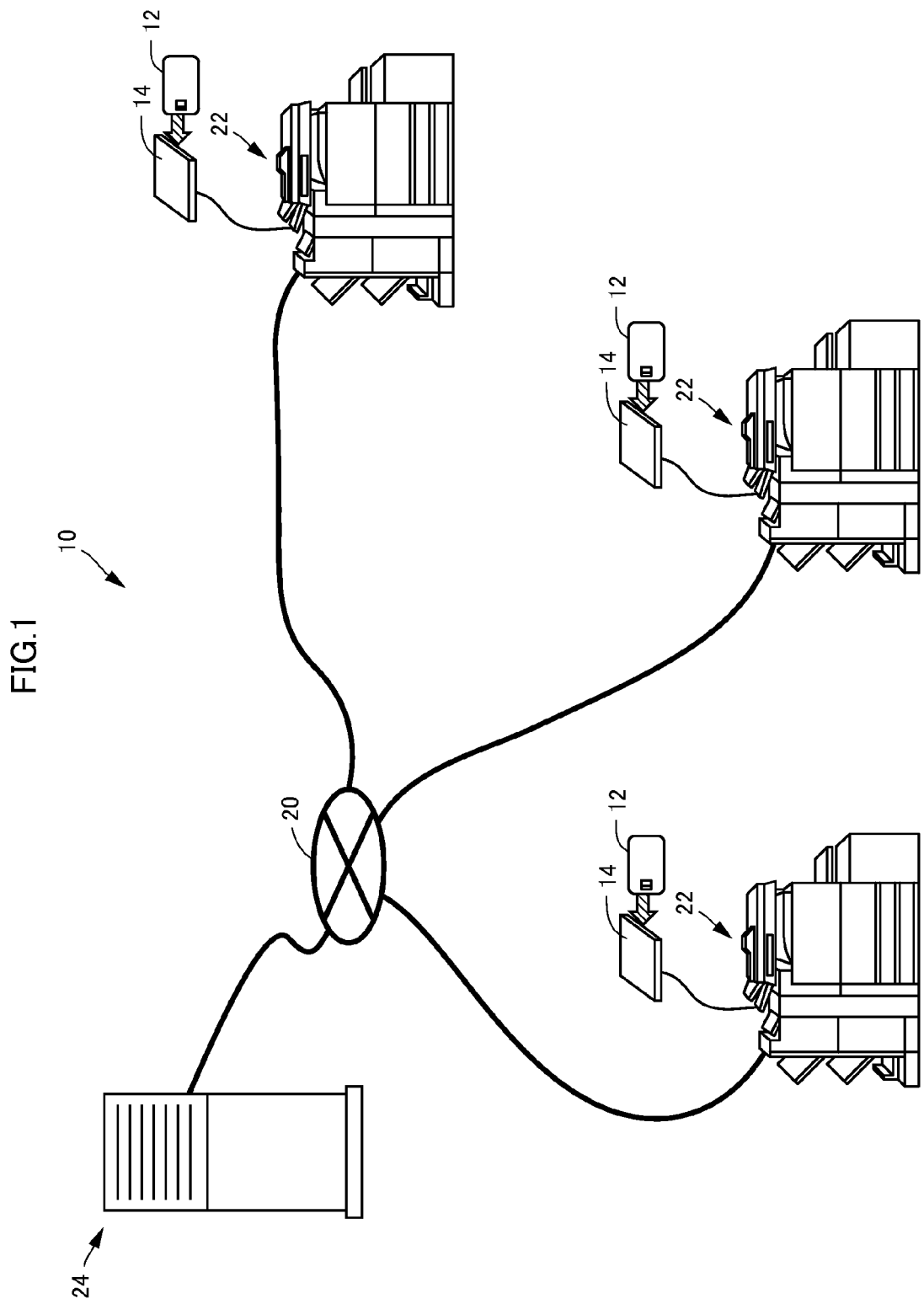
FIG. 1 is a schematic illustration showing a configuration of the user authentication system in accordance with an embodiment of the present invention.

In the following description and in the drawings, the same components are denoted by the same reference characters and same names. Their functions are also the same. Therefore, detailed description thereof will not be repeated each time.

Referring to FIG. 1, a user authentication system 10 includes a plurality of image forming apparatuses 22 including an IC card reader 14 reading identification information for identifying a registered user from an IC card 12; and a data processing device 24 performing data communication with the plurality of image forming apparatuses 22 through a network 20. Image forming apparatus 22 and IC card reader 14 are electrically connected to each other through a USB (Universal Serial Bus: registered trade mark) cable, and capable of transmitting/receiving various data to/from each other. Image forming apparatus 22 and data processing device 24 are connected to each other through network 20 implemented by LAN (Local Area Network) line, and capable of transmitting/receiving various data to/from each other.

In the user authentication system 10, data processing device 24 decides IC card standard to be used by IC card reader 14 connected to each image forming apparatus 22. The IC card standard here refers to the standard defined by ISO/IEC 14443 for a proximity type IC card, ISO/IEC 10536 for a close coupling type IC card, ISO/IEC 15693 for the vicinity type IC card as international standards of non-contact type IC cards, Felica (Registered Trademark) or the like. In the present specification, individual IC card standard will be specified by adding an alphabet representing each IC card standard after the term "Type," and expressed such as "Type-A," or "Type-B." Image forming apparatus 22 performs the user authentication process based on whether the identification information can be read in accordance with the decided IC card standard, and executes various processes depending on the result of user authentication process. Here, the user authentication process refers to a process for determining whether or not the user who is about to use the image forming apparatus 22 is a registered user allowed to use the image forming apparatus 22.

<Hardware Configuration>
[Image Forming Apparatus 22]

Figure 2:
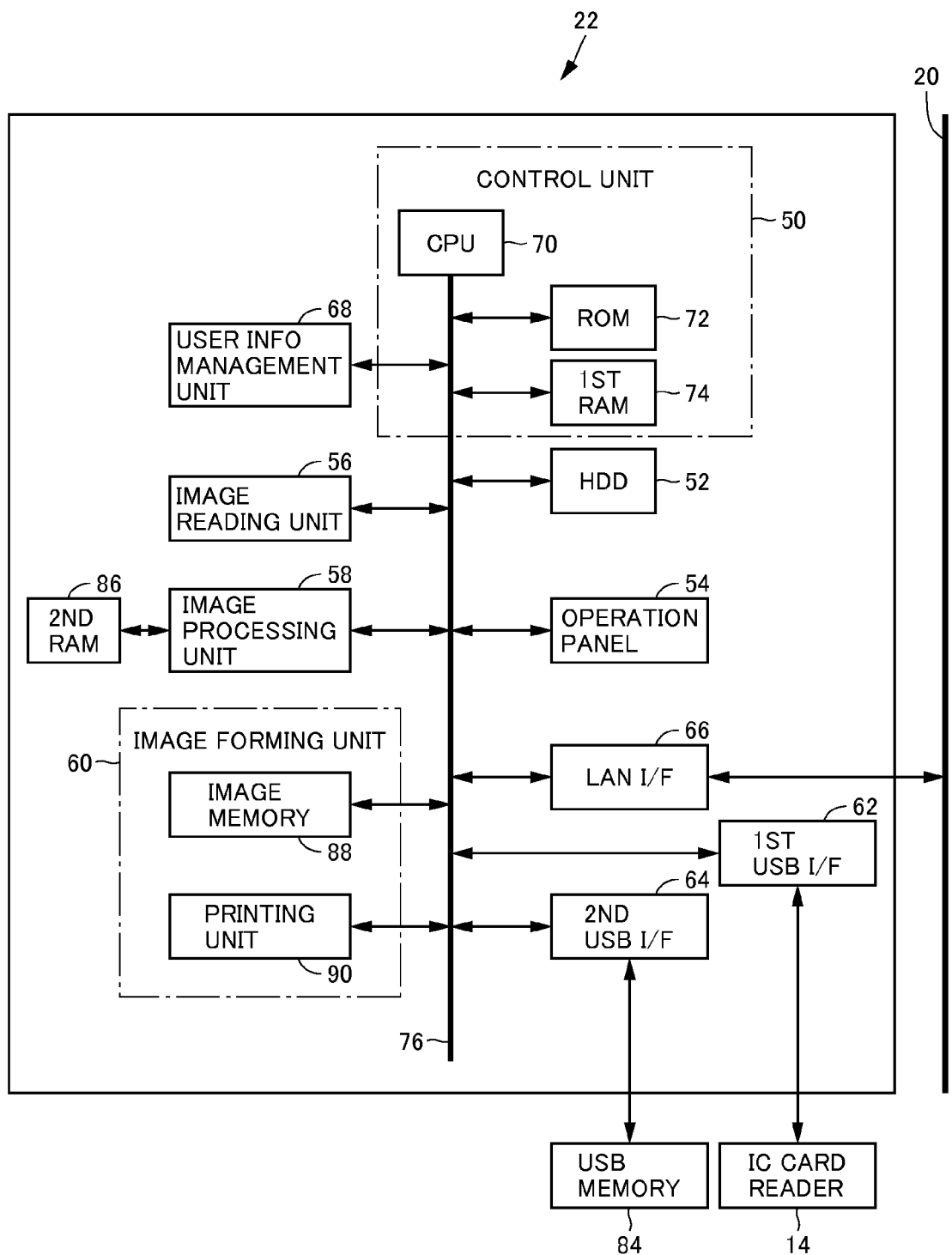
FIG. 2 is a block diagram showing a configuration of an image forming apparatus to which an IC card reader is connected.

Referring to FIG. 2, image forming apparatus 22 is, for example, an MFP (Multi-Function Printer) having a scanner function, a copy function, a facsimile function and a printer function. Image forming apparatus 22 includes a control unit 50, an HDD (Hard Disk Drive) 52, an operation panel 54, an image reading unit 56, an image processing unit 58, an image forming unit 60, a first USB interface (USB I/F) 62, a second USB I/F 64, an LAN interface (LAN I/F) 66 and a user information management unit 68.

Control unit 50 is substantially a computer, including a CPU (Central Processing Unit) 70, an ROM (Read-Only Memory) 72, and a first RAM (Random Access Memory) 74. A bus line 76 is connected to CPU 70, and to bus line 76, ROM 72 and the first RAM 74 are electrically connected. CPU 70 executes desired processes such as operations of various components of image forming apparatus 22 and communication with external equipment such as data processing device 24, by executing various computer programs in accordance with instructions from operation panel 54 and the like. The various computer programs mentioned above are stored beforehand in ROM 72, and when a desired process is to be executed, the program is read from ROM 72 and transferred to the first RAM 74. CPU 70 reads a program instruction from an address in the first RAM 74 designated by a value stored in a register called a program counter, not shown, in CPU 70, and interprets the instruction. Further, CPU 70 reads data necessary for operation from an address designated by the read instruction, and executes an operation corresponding to the instruction on the data. The result of execution is also stored at an address designated by the instruction, such as a register in CPU 70, HDD 52 or the first RAM 74.

In the present embodiment, ROM 72 stores a computer program for controlling and operating the user authentication system 10. The program structure for realizing the user authentication system 10 in the computer program will be described later.

To the bus line 76, HDD 52, operation panel 54, image reading unit 56, image processing unit 58, image forming unit 60, first USB I/F 62, second USB I/F 64, LAN I/F 66 and user information management unit 68 are further connected electrically.

HDD 52 includes a magnetic storage medium. HDD 52 provides a storage area storing various data including user information reading method data, password and image data input from image memory 88, as will be described later. Specifically, HDD 52 stores in advance an identification ID (Identification Number) of image forming apparatus 22, all IC card standards supported by IC card reader 14, and installation site name of image forming apparatus 22, in relation to each other, as user information reading method data. Here, identification ID refers to an ID uniquely assigned to each image forming apparatus 22, for identifying and distinguishing image forming apparatuses 22 from each other. The identification ID is not specifically limited and any number or the like generally used in the art may be used. By way of example, an IP (Internet Protocol) address or the like may be used. If the IP address is used as the identification ID, each image forming apparatus 22 can be recognized as an individual image forming apparatus on the network 20, and therefore, an external device such as data processing device 24 can perform data processing for the individual image forming apparatus 22. The installation site name of image forming apparatus 22 refers to the site information indicating the site where the image forming apparatus 22 is installed. The site information is, by way of example, the name or number set individually for a room in an office building in which different companies occupy different rooms. The installation site name of image forming apparatus 22 is input through operation panel 54 by an administrator of image forming apparatus 22, for example, when image forming apparatus 22 is installed. Table 1 shows an example of user information reading method data.

TABLE 1

| IP address | IC card standard | Installation site name |
|---|---|---|
| 192.0.0.1 | Type-A | Type-C | Room a |

Referring to Table 1, in the present embodiment, an IP address "192. 0.0.1" as an identification ID unique to image forming apparatus 22, Type-A and Type-C as the IC card standards supported by IC card reader 14 and the name "Room a" of installation site of image forming apparatus 22 are stored in relation to each other, in the form of a table. In the present specification, the room named "Room a" (hereinafter simply denoted as "Room a") is a room to which "Company A" belongs, in an office building in which different companies occupy different rooms. The registered users of image forming apparatus 22 installed in "Room a" are company members of Company A.

HDD 52 further stores in advance a password to determine whether or not the user who is about to use image forming apparatus 22 is a registered user. Here, the password refers to a character sequence including a numeral, letter, sign or the like given only to the registered user who is allowed to use image forming apparatus 22.

Operation panel 54 is formed by an input unit including a touch panel with various input keys and the like allowing the user to input the password, data of user information reading method and the like, and a display unit such as a liquid crystal display (LCD), placed in an overlapping manner. On operation panel 54, when an image of operation keys are displayed on the display unit and coordinates of the position of the operation key that is touched by the user at the input unit are known, the user instruction related to the operation and various settings of image forming apparatus 22 can be understood. When information to be indicated to the user such as the contents of user instruction is displayed on the display unit and a control signal corresponding to the instruction is output to control unit 50, a process in accordance with the input operation by the user can be realized. By appropriately switching images displayed on the display unit, images of a large number of different operation keys can be displayed and, therefore, using operation panel 54 of a limited area, user input operations related to many processes can be realized. On the display unit, not only the displays related to the input operation but also information such as messages for giving notice to the user are displayed.

Image reading unit 56 includes an optical system including a document detection sensor and a CCD (Charge-Coupled Device) line sensor (both not shown). The document detection sensor forms, on the CCD line sensor, an image of a reflected light obtained by irradiating an image-bearing surface of a document placed on a platen (not shown) manually by the user or by an ADF (Automatic Document Feeder) with light from a light source (not shown). The CCD line sensor successively performs photo-electric conversion of the image formed by reflected light, and outputs the result as image data to an image memory 88, which will be described later. Image reading unit 56 reads, using the document detection sensor, image information of the document placed on the platen at the time of copying or scanning a document, converts the read image information to electric signals by the CCD line sensor, and outputs the result as the image data to image memory 88.

Image processing unit 58 includes an MPU (Micro Processing Unit, not shown). Image processing unit 58 performs prescribed image processing operations such as γ (gamma) correction and filtering, on the image data input from image reading unit 56 or from an external device to image memory 88, and performs various processes such as compression and expansion, using a second RAM 86 as a dedicated memory, outputs image data subjected to such processes once to image memory 88 page by page, and then stores the image data in HDD 52.

Image forming unit 60 includes image memory 88 and a printing unit 90. Image memory 88 includes an RAM, and temporarily stores the image data page by page. In response to an instruction from control unit 50 or the like, image memory 88 successively reads image data to be transmitted to printing unit 90 from HDD 52 page by page and stores the data temporarily, and in synchronization with image formation by printing unit 90, outputs the stored image data to printing unit 90. In this manner, as the HDD 52 stores a plurality of image data and image memory 88 successively processes the image data page by page even when there are a plurality of image data to be transmitted to printing unit 90, it is possible to perform image forming operations quickly and efficiently.

Printing unit 90 includes a photoreceptor, a charger, an LSU (Laser Scanning Unit), a developer, a transfer unit, a cleaning unit, and a fixing unit (all not shown). Printing unit 90 further includes a manual feed tray and first and second paper feed trays (all not shown) that are detachably attached to image forming apparatus 22. These paper feed trays are arranged from top to bottom in this order. These paper feed trays hold sheets of recording paper, and feed sheets of recording paper to a paper feeding unit (not shown). The manual feed tray is for allowing the user to set a desired sheet of recording paper. The first and second paper feed trays are to hold sheets of recording paper of different sizes. In response to an instruction from control unit 50 or the like, printing unit 90 forms an image based on the image data transmitted from image memory 88, on the sheet of recording paper fed from any of the paper feed trays through the paper feeding unit.

First and second USB I/Fs 62 and 64 are each Hot-Plug-supporting interface having a USB port. First and second USB I/Fs 62 and 64 automatically recognize an external device electrically connected to image forming apparatus 22 while the apparatus is in operation, through a USB cable. In the present embodiment, IC card reader 14 is connected to first USB I/F 62. IC card reader 14 is an identification information reading device for performing a process of reading identification information included in an IC card 12. IC card reader 14 is formed to support a plurality of IC card standards (in the present embodiment, Type-A and Type-C). When IC card 12 is inserted to a card insertion slot (not shown), IC card reader 14 reads identification information included in IC card 12 in accordance with IC card standard set at user information management unit 68, and outputs a read signal including the read identification information to control unit 50. To the second USB I/F 64, a USB memory 84, for example, as an auxiliary storage unit is connected. USB memory 84 can be freely attached to/detached from second USB I/F 64.

Image forming apparatus 22 is connected to network 20 formed of LAN line, through LAN I/F 66. Image forming apparatus 22 is capable of facsimile communication with a facsimile machine or the like connected to network 20, and capable of data communication with data processing device 24.

User information management unit 68 includes an MPU and an RAM (both not shown). User information management unit 68 sets IC card standard to be used by IC card reader 14, and sets a user authentication method to be used for user authentication by image forming apparatus 22. Specifically, in response to an instruction from control unit 50 or the like, the MPU performs the settings mentioned above by temporarily storing the IC card standard to be used by IC card reader 14 and the user authentication method to be used by image forming apparatus 22 in the RAM. In the RAM, various data are stored temporarily, as old information is erased or overwritten by latest data. In the present embodiment, image forming apparatus 22 is adapted to support an IC card authentication method (authentication using IC card) or an operation panel authentication method (authentication using operation panel), which will be described later, as the user authentication method.

A power source (not shown) is connected to each component of image forming apparatus 22 such as user information management unit 68 and CPU 70 of control unit 50. Operations of various components in image forming apparatus 22 are realized when voltage is applied from the power source.

By the operations of various components mentioned above, image forming apparatus 22 executes any of various operation modes including a copy mode in which a document image is read and printed on a sheet of recording paper, a printer mode in which image data transmitted from an external device or the like is received and printed on a sheet of recording paper, a scanner mode in which a document image is read and transmitted to an external device and a FAX mode in which facsimile communication with a facsimile machine takes place, in accordance with an instruction given by an input operation by the user through operation panel 54 or an instruction from an external device.

[Data Processing Device 24]

Figure 3:
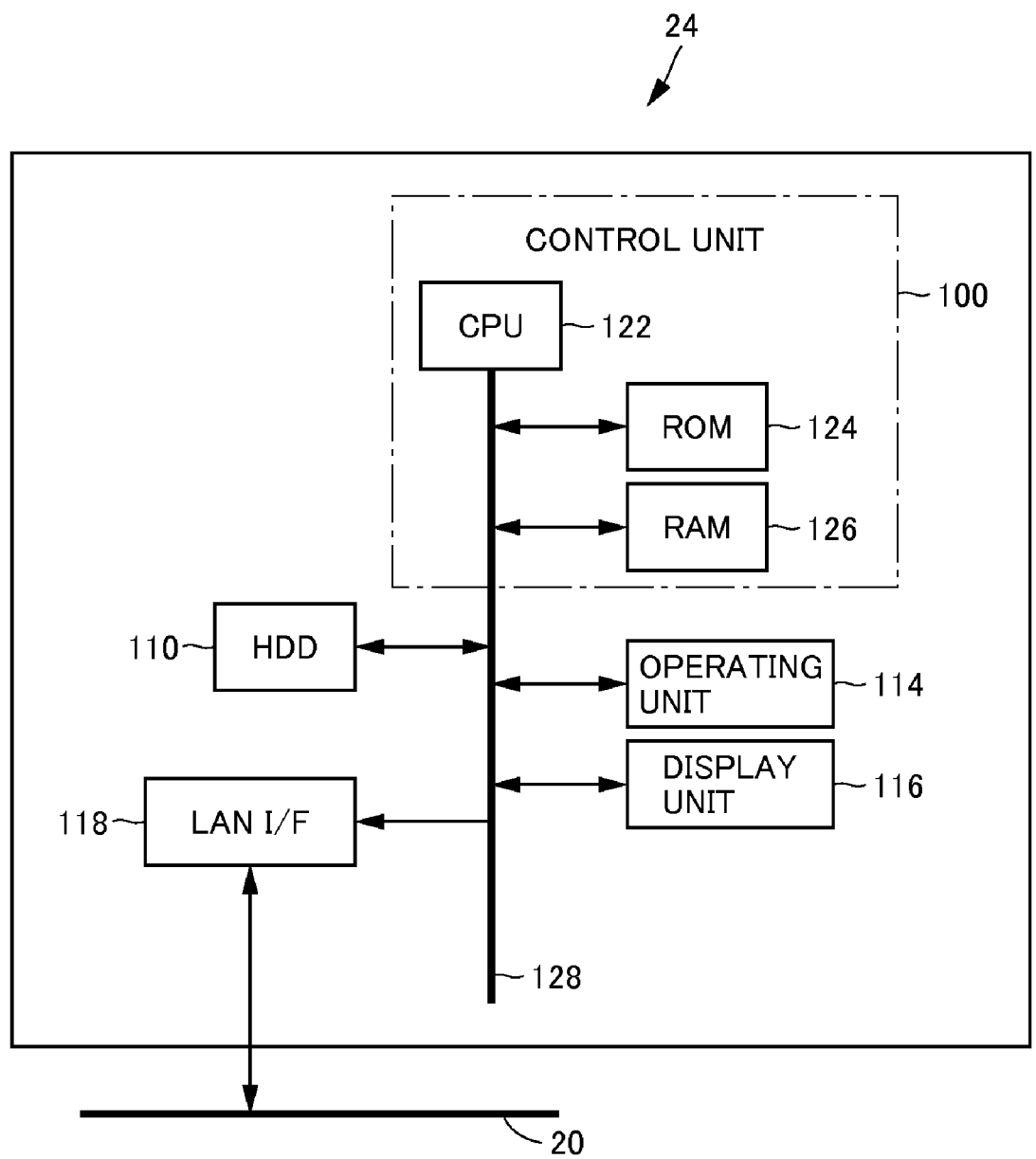
FIG. 3 is a block diagram showing a configuration of the data processing device.

Referring to FIG. 3, data processing device 24 is a server including a control unit 100, an HDD 110, an operating unit 114, a display unit 116 and an LAN I/F 118.

Control unit 100 is substantially a computer, including a CPU 122, an ROM 124 and an RAM 126. To CPU 122, a bus line 128 is connected, and to bus line 128, ROM 124 and RAM 126 are electrically connected. CPU 122 executes a desired process such as communication with an external device such as image forming apparatus 22 and operations of various components of data processing device 24, by executing various computer programs in accordance with an instruction from operating unit 114 or from an external device such as image forming apparatus 22. The various computer programs mentioned above are stored in advance in ROM 124, and when a desired process is executed, read from ROM 124 and transferred to RAM 126. CPU 122 reads a program instruction from an address in RAM 126 designated by a value stored in a register, which is referred to as a program counter, not shown, in CPU 122, and interprets the instruction. Further, CPU 122 reads data necessary for operation from an address designated by the read instruction, and executes an operation corresponding to the instruction on the data. The result of execution is also stored at an address designated by the instruction, in a register, for example, in CPU 122 and RAM 126.

In the present embodiment, ROM 124 stores a computer program for controlling and operating user authentication system 10. The program structure for realizing the user authentication system 10 in the computer program will be described later.

To bus line 128, HDD 110, operating unit 114, display unit 116 and LAN I/F 118 are also electrically connected.

HDD 110 includes a magnetic recording medium. HDD 110 provides a storage area for storing various data including management data as will be described later. Specifically, HDD 110 stores in advance the installation site name of image forming apparatus 22, and IC card standard usable by IC card 12 that is held only by the registered user who is allowed to use image forming apparatus 22 installed at the site, in relation to each other as management data. Table 2 shows an example of management data.

TABLE 2

| Installation site name | IC card standard | | | | |
|---|---|---|---|---|---|
| Room a | Type A | Type-B | — | ... | — |
| Room b | Type-C | — | — | ... | — |
| ... | ... | ... | ... | ... | ... |
| Room n | Type A | Type-C | Type-D | ... | Type-Z |

Referring to Table 2, in the present embodiment, the installation site name "Room a" of image forming apparatus 22 and Type-A and Type-B as the IC card standards of IC card 12 held by company member of "Company A" as the registered user of image forming apparatus 22 installed in "Room a" are stored in relation to each other in the form of a table. Specifically, to a company member of "Company A" as a registered user of image forming apparatus 22 installed in "Room a", an IC card 12 satisfying the IC card standard of Type-A or Type-B is handed out beforehand by an administrator or the like. Similarly, a plurality of installation site names from Room a to Room n, and IC card standards of IC cards 12 held only by registered users of image forming apparatuses 22 installed in respective installation sites are stored in relation to each other.

Operating unit 114 is implemented by a keyboard as an input device allowing character input and the like. The management data mentioned above is input by an administrator or the like of data processing device 24, through operating unit 114. Display unit 116 is a display device formed of a liquid crystal display or the like, for displaying result of processing by data processing device 24 and the like. Operating unit 114 and display unit 116 are connected to bus line 128 through an interface (not shown).

Data processing device 24 is connected to network 20 formed of a LAN line, through LAN I/F 118. Data processing device 24 is capable of data communication with image forming apparatus 22 connected to network 20.

To components of data processing device 24 such as display unit 116 and CPU 122 of control unit 100, a power source (not shown) is connected. The operation of each component of data processing device 24 is realized when a voltage is applied from the power source.

<Software Configuration>

[Image Forming Apparatus 22]

As described above, the computer program stored in ROM 72 of image forming apparatus 22 is programmed to control user authentication system 10 as a whole, to enable its operation. The program is executed through a determining function and an operation control function realized by cooperation between hardware and the computer program, by a computer including a CPU 70 substantially constituting control unit 50, controlling operations of IC card reader 14 and image forming apparatus 22 in accordance with the computer program described above. The determining function refers to the function of performing each of the determining processes as will be described later such as a determination as to whether the user who is about to use the image forming apparatus 22 is a registered user or not, and the operation control function refers to a function of setting image forming apparatus 22 to a usable or an unusable state.

Figure 4:
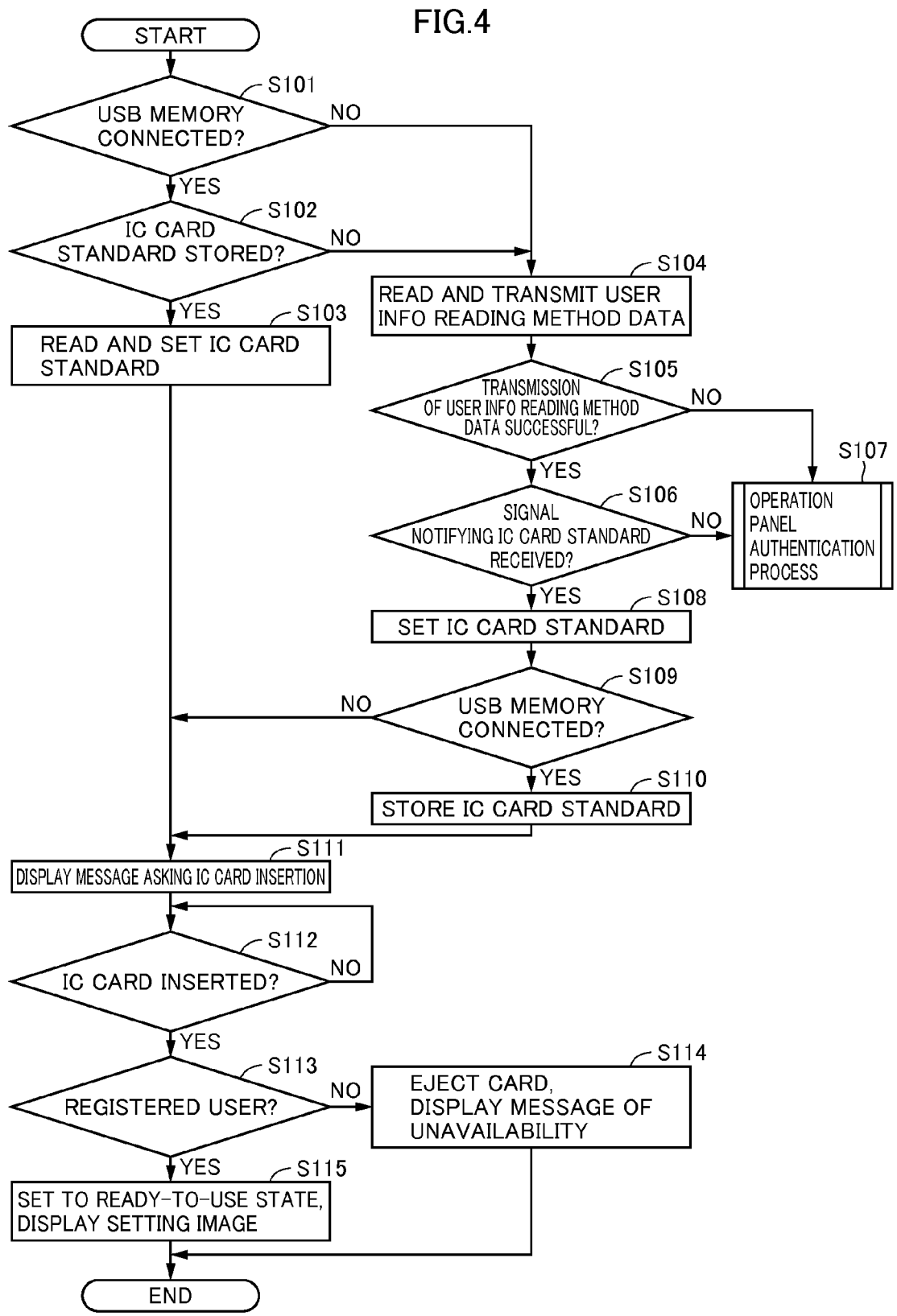
FIG. 4 shows, in the form of a flowchart, a program structure for realizing the user authentication system in the image forming apparatus.

Referring to FIG. 4, the program for realizing the user authentication system 10 in image forming apparatus 22 is activated by the user or the like turning on the power of image forming apparatus 22. When image forming apparatus 22 is powered on, that is, when image forming apparatus 22 is activated, image forming apparatus 22 is set to a state unusable by control unit 50, and at user information management unit 68, the IC card authentication method is set as the user authentication method.

The program includes: a step 101 of determining whether or not USB memory 84 is connected to second USB I/F 64 and branching control flow depending on the result of determination; a step 102 executed if it is determined at step 101 that USB memory 84 has been connected (YES), of determining whether or not USB memory 84 is storing IC card standard; and a step 103 executed if it is determined at step 102 that USB memory 84 is storing the IC card standard (YES), of reading the IC card standard from USB memory 84 and setting the read IC card standard to the user information management unit 68.

The program further includes: a step 104 executed if it is determined at step 101 that USB memory 84 is not connected (NO) or if it is determined at step 102 that USB memory 84 does not have the IC card standard stored therein (NO), of reading user information reading method data from HDD 52 and transmitting the read user information reading method data through LAN I/F 66 and network 20 to data processing device 24; a step 105 of monitoring LAN I/F 66 to determine whether or not transmission of user information reading method data has been successful, and branching control flow depending on the result of determination; and a step 106 executed if it is determined at step 105 that transmission of user information reading method data has been successful (YES), of monitoring LAN I/F 66 and determining whether or not a signal indicating an IC card standard used by IC card reader 14 has been received from data processing device 24 within a predetermined prescribed time period, and branching control flow depending on the result of determination.

The program further includes a step 107 executed if it is determined at step 105 that the transmission of user information reading method data has not been successful (NO), or if it is determined at step 106 that the signal indicating the IC card standard has not been received within the predetermined prescribed time period (NO), of executing an operation penal authentication process, which will be described later.

The program further includes: a step 108 executed if it is determined at step 106 that the signal indicating the IC card standard has been received within the predetermined prescribed time period (YES), of setting, in user information management unit 68, the IC card standard to be used by IC card reader 14 based on the indicated IC card standard; and a step 109 of again determining whether or not USB memory 84 is connected to second USB I/F 64, and branching control flow depending on the result of determination.

The program further includes: a step 110 executed if it is determined at step 109 that USB memory 84 is connected (YES), of storing the indicated IC card standard in USB memory 84; and a step 111 of displaying a message asking insertion of IC card 12 to a card insertion slot (not shown) of IC card reader 14, such as "Insert Card", on the display unit of operation panel 54. Step 111 is also executed if it is determined at step 109 that USB memory 84 is not connected (NO).

The program further includes a step 112 of monitoring IC card reader 14 and determining whether or not IC card 12 has been inserted to the card insertion slot (not shown) of IC card reader 14, and branching control flow depending on the result of determination. If it is determined at step 112 that IC card 12 has not yet been inserted (NO), step 112 is repeated until insertion is determined.

The program further includes a step 113 executed if it is determined at step 112 that IC card 12 has been inserted (YES), of causing IC card reader 14 to read identification information from IC card 12 in accordance with the IC card standard set in user information management unit 68, determining whether or not the user is a registered user depending on whether the identification information can be read or not, and branching control flow depending on the result of determination.

The program further includes a step 114 executed if it is determined at step 113 that the user is not a registered user (NO), that is, if it is determined that inserted IC card 12 does not satisfy the IC card standard set in user information management unit 68 and the read signal output to control unit 50 is unacceptable, of ejecting the IC card 12 from card insertion slot (not shown) of IC card reader 14, displaying an error message such as "Card not supported" indicating that the user is not a registered user and the image forming apparatus 22 cannot be used, on the display unit of operation panel 54, and ending the present process. By such a display, the user who is about to use the image forming apparatus 22 can easily recognize that he/she is not a registered user and that the image forming apparatus 22 is not available. Therefore, convenience for the user using image forming apparatus 22 can further be improved.

The program further includes a step 115 executed if it is determined at step 113 that the user is a registered user (YES), that is, if it is determined that the inserted IC card 12 satisfies the IC card standard set in user information management unit 68 and the read signal output to control unit 50 is acceptable, of setting image forming apparatus 22 to a state ready to use, and displaying a setting image allowing the user to input an instruction or instructions related to various processes to be performed by image forming apparatus 22, on the display unit of operation panel 54.

Figure 5:
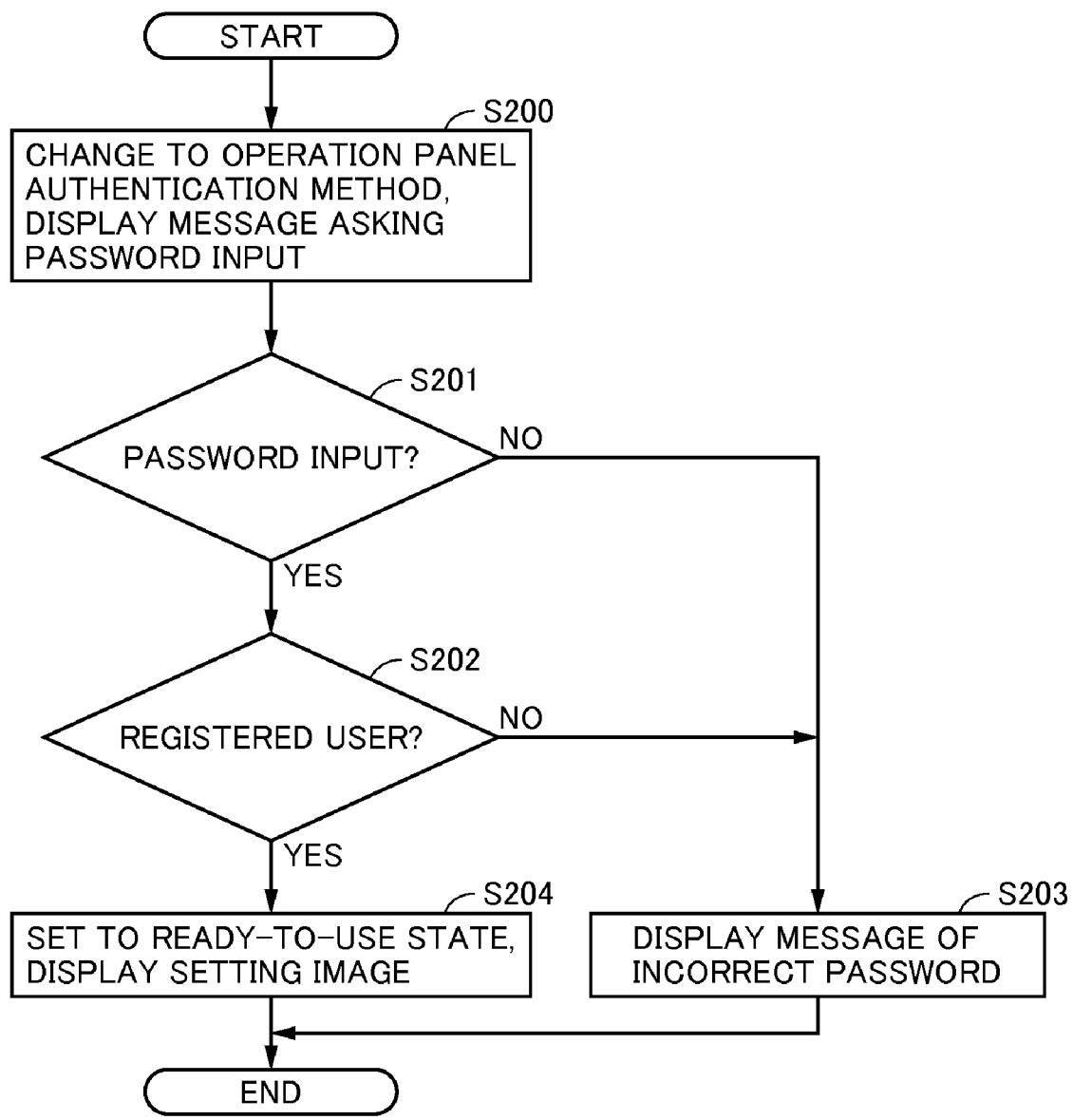
FIG. 5 shows, in the form of a flowchart, a program structure of an operation panel authentication process.

FIG. 5 shows, in the form of a flowchart, a program structure of an operation panel authentication process executed at step 107 shown in FIG. 4. Referring to FIG. 5, the program realizing the operation panel authentication process includes: a step 200 of changing the user authentication method set in user information management unit 68 from IC card authentication method to operation panel authentication method, and displaying a message asking input of a password such as "Enter password" on the display unit of operation panel 54; and a step 201 of monitoring a user input operation to operation panel 54 and determining whether or not a password has been input within a predetermined prescribed time period, and branching control flow depending on the result of determination.

The program further includes a step 202 executed if it is determined at step 201 that a password is input within the predetermined prescribed time period (YES), of reading a password stored in advance in HDD 52 and determining whether or not the read password matches the password input through operation panel 54 to determine whether or not the user is a registered user, and branching control flow depending on the result of determination.

The program further includes a step 203 executed if it is determined at step 202 that the user is not a registered user (NO), that is, if it is determined that the passwords do not match, of displaying an error message such as "Incorrect password" informing that the input password is incorrect, on the display unit of operation panel 54, and ending the present process. Step 203 is also executed if it is determined at step 201 that no password has been input within the predetermined prescribed time period (NO).

The program further includes a step 204 executed if it is determined at step 202 that the user is a registered user (YES), that is, if it is determined that the passwords match, of setting image forming apparatus 22 to a state ready to use, and displaying a setting image allowing the user to input an instruction or instructions related to various processes to be performed by image forming apparatus 22, on the display unit of operation panel 54.

In this manner, the user authentication process for determining whether or not the user is a registered user is possible not only by using IC card reader 14 but also by using a password. Therefore, even if determination by IC card reader 14 is impossible because of some trouble, determination is still possible. Therefore, convenience for the user using image forming apparatus 22 can further be improved.

Further, if transmission of user information reading method data to be transmitted from image forming apparatus 22 to data processing device 24 should fail, or if reception of a signal notifying the IC card standard to be used by IC card reader 14 transmitted from data processing device 24 to image forming apparatus 22 should fail, determination as to whether the user is a registered user or not is performed by using a password. Therefore, even if determination by IC card reader 14 is impossible because of some communication trouble, determination is still possible. Therefore, convenience for the user using image forming apparatus 22 can further be improved.

[Data Processing Device 24]

As described above, the computer program stored in ROM 124 of data processing device 24 is programmed to control user authentication system 10 as a whole and to enable its operation. The program is executed by the deciding function and the like realized by cooperation of hardware and computer program, by a computer including CPU 122 substantially constituting control unit 100 controlling the operation of data processing device 24 in accordance with the computer program. The deciding function mentioned above refers to the function of deciding the IC card standard used by IC card reader 14.

Figure 6:
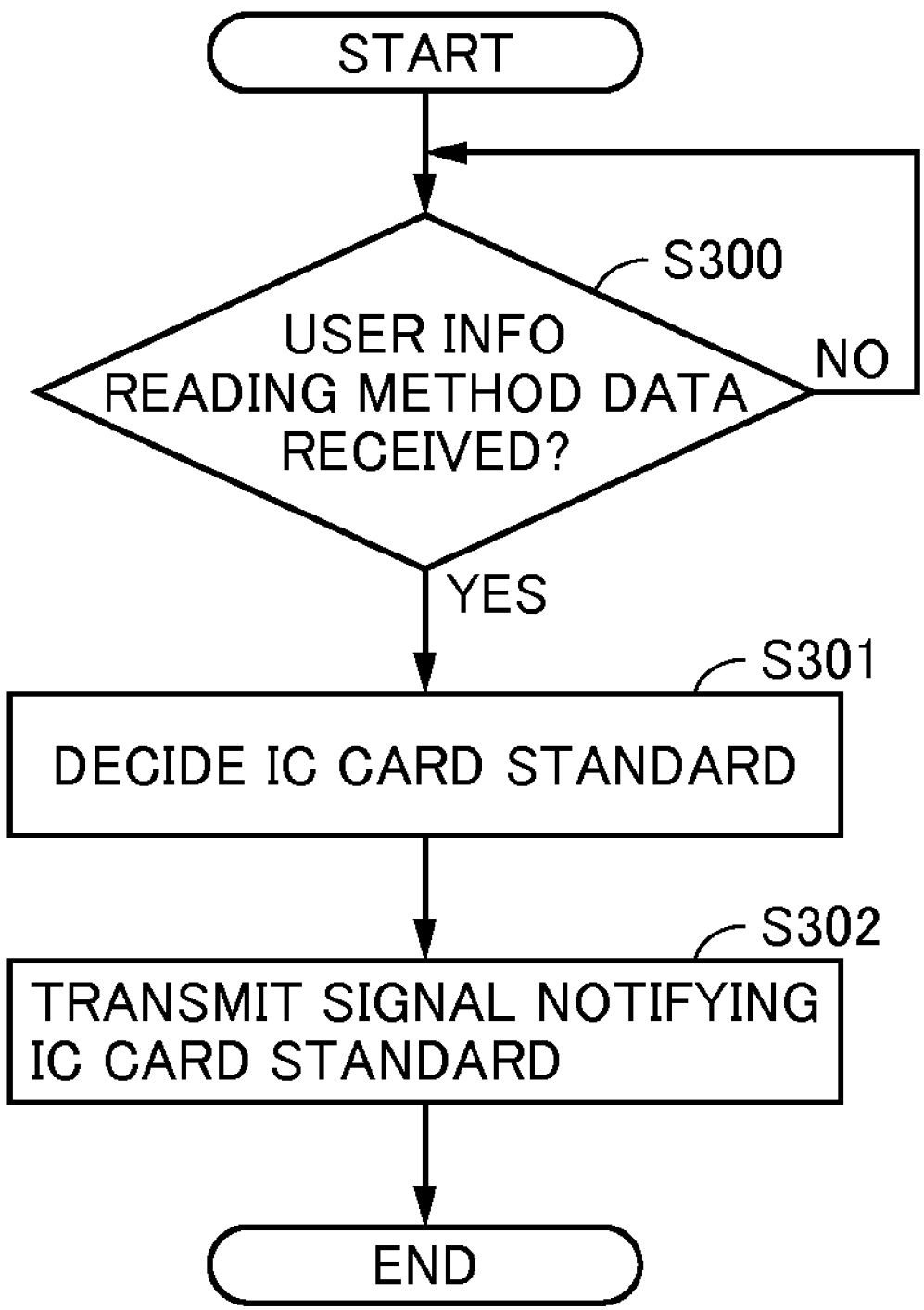
FIG. 6 shows, in the form of a flowchart, a program structure for realizing the user authentication system in the data processing device.

Referring to FIG. 6, the program for realizing the user authentication system 10 in data processing device 24 is activated by the user or the like turning on the power of data processing device 24.

The program includes a step 300 of monitoring LAN I/F 118 and determining whether or not LAN I/F 118 has received the user information reading method data transmitted from image forming apparatus 22 connected thereto, and branching control flow depending on the result of determination. If it is determined at step 300 that the user information reading method data has not been received (NO), step 300 is repeated until reception is determined.

The program further includes a step 301 executed if it is determined at step 300 that the user information reading method data has been received (YES), of reading management data stored in advance in HDD 110, and deciding, based on the read management data and the received user information reading method data, the IC card standard used by IC card reader 14. Specifically, at step 301, the management data and the user information reading method data are compared using the installation site name of image forming apparatus 22 as a key, and the matching IC card standard is decided to be the IC card standard used by IC card reader 14.

The program further includes a step 302 of transmitting a signal indicating the IC card standard decided at step 301 to image forming apparatus 22 having a corresponding identification ID, through LAN I/F 118 and network 20.

<Operation>

(When USB Memory 84 is not Mounted on Image Forming Apparatus 22)

When USB memory 84 is not mounted on image forming apparatus 22, data processing device 24 and image forming apparatus 22 to which IC card reader 14 is connected in accordance with the present embodiment operate in the following manner.

The power of data processing device 24 is always on and CPU 122 of control unit 100 of data processing device 24 monitors LAN I/F 118 constantly. The management data is input beforehand by an administrator or the like of data processing device 24 through operating unit 114 to HDD 110, and the user information reading method data is input beforehand by an administrator or the like of image forming apparatus 22 through operation panel 54 to HDD 52, when image forming apparatus 22 is newly installed.

When a user who is going to use the image forming apparatus 22 turns on the power of image forming apparatus 22, CPU 70 of control unit 50 of image forming apparatus 22 sets image forming apparatus 22 to a state not ready to use, and starts monitoring of second USB I/F 64, LAN I/F 66 and IC card reader 14, while user information management unit 68 sets the IC card authentication method as the user authentication method.

Determining that USB memory 84 is not connected to second USB I/F 64, CPU 70 of control unit 50 reads the user information reading method data from HDD 52, and transmits the read user information reading method data to data processing device 24 through LAN I/F 66 and network 20.

Determining that LAN I/F 118 has received the user information reading method data transmitted from image forming apparatus 22, CPU 122 of control unit 100 of data processing device 24 reads the management data that has been stored in advance in HDD 110, and based on the read management data and the received user information reading method data, decides the IC card standard used by IC card reader 14. In the present embodiment, the management data (see Table 2) and the user information reading method data (see Table 1) are compared using the installation site name "Room a" of image forming apparatus 22 as a key. Of Type-A and Type-B as the IC card standards stored in relation to "Room a" in the management data, Type-A, which is the IC card standard that matches the IC card standard supported by IC card reader 14 stored in user information reading method data, is decided to be the IC card standard used by IC card reader 14. As the management data and the user information reading method data are compared using the installation site name of image forming apparatus 22 as a key and the IC card standard is decided thereby, it is possible to change the IC card standard used for user authentication process by site of installation of the image forming apparatus 22. Therefore, it is possible to limit the users of image forming apparatus 22 on the basis of location, such as a room or a floor. Therefore, it is possible to prevent a user from using an image forming apparatus 22 installed at a site different from a site such as a room or floor where the use is allowed, and hence, correct management of image forming apparatus 22 becomes possible. Further, security related to the use of image forming apparatus 22 can be enhanced. Further, a company member of "Company A" that occupies the room named "Room a" is authorized as a registered user of image forming apparatus 22 installed in "Room a" if he/she uses IC card 12 handed out beforehand. Therefore, it becomes unnecessary to prepare different IC cards 12 for each image forming apparatus 22. Therefore, convenience for the user using image forming apparatus 22 can further be improved.

CPU 122 of control unit 100 transmits a signal indicating the decided IC card standard to image forming apparatus 22 having the IP address "192.0.0.1" as the corresponding identification ID, through LAN I/F 118 and network 20. As the destination of transmitting the signal is decided based on the identification ID stored in the user information reading method data, it is possible to reliably indicate the decided IC card standard to the corresponding image forming apparatus 22, even when the user information reading method data are transmitted from a plurality of image forming apparatuses 22 to data processing device 24.

Determining that transmission of user information reading method data is successful and that LAN I/F 66 has received the signal indicating the decided IC card standard from data processing device 24 within a predetermined prescribed time period, CPU 70 of control unit 50 sets in user information management unit 68, the IC card standard to be used by IC card reader 14, based on the indicated IC card standard.

Again determining that USB memory 84 is not connected to the second USB I/F 64, CPU 70 of control unit 50 displays a message such as "Insert card" on the display unit of operation panel 54, asking insertion of IC card 12 to the card insertion slot (not shown) of IC card reader 14.

When the user inserts IC card 12 to the card insertion slot (not shown) of IC card reader 14, CPU 70 of control unit 50 determines that IC card 12 has been inserted to the card insertion slot (not shown) of card reader 14, and causes IC card reader 14 to read the identification information from IC card 12, in accordance with the IC card standard set in user information management unit 68. Then, depending on whether or not the identification information can be read, it determines whether or not the user is a registered user.

Determining that the inserted IC card 12 supports Type-B not satisfying the IC card standard set in user information management unit 68, the read signal output to control unit 50 is unacceptable and the user is not a registered user, CPU 70 of control unit 50 ejects IC card 12 from the card insertion slot (not shown) of IC card reader 14, and displays a message such as "Card not supported" on the display unit of operation panel 54, indicating that the user is not a registered user and that image forming apparatus 22 is unavailable. At this time, image forming apparatus 22 is kept in a state not ready to use, and the user cannot use the image forming apparatus 22.

Determining that the inserted IC card 12 satisfies the IC card standard set in user information management unit 68, the read signal output to control unit 50 is acceptable and hence the user is a registered user, CPU 70 of control unit 50 sets image forming apparatus 22 to a state ready to use, and displays a setting image allowing the user to input an instruction or instructions related to various processes to be performed by image forming apparatus 22, on the display unit of operation panel 54.

If any communication trouble between image forming apparatus 22 and data processing device 24 should occur during the operation described above, CPU 70 of control unit 50 determines that transmission of user information reading method data failed, or LAN I/F 66 did not receive the signal indicating the decided IC card standard from data processing device 24 within the predetermined prescribed time period, and changes the user authentication method set in user information management unit 68 from the IC card authentication method to the operation panel authentication method, and displays a message such as "Enter password" on the display unit of operation panel 54, asking input of a password.

If the user inputs a password through operation panel 54 within a predetermined prescribed time period, CPU 70 of control unit 50 determines that the password has been input within the predetermined prescribed time period, reads a password stored beforehand in HDD 52, and depending on whether or not the read password matches the password input through operation panel 54, determines whether or not the user is a registered user. If the password does not match and the user is determined not to be the registered user, a message such as "Incorrect password" is displayed on the display unit of operation panel 54, informing that the input password is incorrect. The message is also displayed if it is determined by CPU 70 of control unit 50 that a password was not input within the predetermined prescribed time period. When this message is displayed, image forming apparatus 22 is kept in a state not ready to use, and the user cannot use the image forming apparatus 22.

Determining that the passwords match and the user is a registered user, CPU 70 of control unit 50 sets image forming apparatus 22 to a state ready to use, and displays a setting image allowing the user to input an instruction or instructions related to various processes to be performed by image forming apparatus 22, on the display unit of operation panel 54.

When the registered user confirms the displayed setting image and performs an input operation for executing a desired job through operation panel 54, CPU 70 of control unit 50 executes a process in accordance with the input operation by the user, based on the control signal input from operation panel 54.

When all desired processes end, the user ejects IC card 12 from the card insertion slot (not shown) of IC card reader 14, turns off the power of image forming apparatus 22, and ends use of the image forming apparatus 22.

The management data can be rewritten by an input operation from operating unit 114 by an administrator or the like of data processing device 24, and the user information reading method data can be rewritten by an input operation from operation panel 54 by an administrator or the like of image forming apparatus 22.

Assume, for example, that IC card 12 held by company member of "Company A" as the registered user of image forming apparatus 22 installed in "Room a" is changed and that Type-A and Type-B as the IC card standards stored in relation to "Room a" in the management data (see Table 2) are changed to Type-B and Type-C by, for example, an administrator of data processing device 24. CPU 122 of control unit 100 decides the IC card standard used by IC card reader 14 in the following manner. Specifically, it compares the management data and the user information reading method data using "Room a" as the installation site name of image forming apparatus 22 as a key, and of Type-B and Type-C as the IC card standards stored in relation to "Room a" in the management data, Type-C that is the IC card standard matching the IC card standard supported by IC card reader 14 stored in the user information reading method data is decided to be the IC card standard used by IC card reader 14.

In this manner, the user information reading method data and the management data can be changed by operation panel 54 of image forming apparatus 22 and operating unit 114 of data processing device 24. Therefore, if the information stored in the management data and the user information reading method data are changed when, for example, IC card reader 14 is exchanged or the registered user is changed, the IC card standard used by IC card reader 14 can quickly and accurately be decided. As a result, the user authentication process can be done quickly and accurately. Therefore, convenience for the user using image forming apparatus 22 can further be improved.

(When USB Memory 84 is Mounted on Image Forming Apparatus 22)

When USB memory 84 is mounted on image forming apparatus 22, image forming apparatus 22 to which IC card reader 14 is connected and data processing device 24 in accordance with the present embodiment operate in the following manner. The operations when USB memory 84 is mounted are the same as those when USB memory 84 is not mounted, except for the operation from the determination by CPU 70 of control unit 50 that USB memory 84 is connected until a message asking insertion of IC card 12 is displayed on the display unit of operation panel 54.

Determining that USB memory 84 is connected to second USB I/F 64, CPU 70 of control unit 50 determines whether USB memory 84 stores the IC card standard or not. Determining that USB memory 84 stores the IC card standard, it reads the IC card standard from USB memory 84, and sets the read IC card standard to user information management unit 68.

Determining that USB memory 84 does not store the IC card standard, CPU 70 of control unit 50 sets the IC card standard in user information management unit 68 in the same manner as when USB memory 84 is not mounted. Then, again determining that USB memory 84 is connected to second USB I/F 64, it stores the IC card standard notified from data processing device 24, in USB memory 84.

CPU 70 of control unit 50 displays a message such as "Insert card" on the display unit of operation panel 54, asking insertion of IC card 12 to the card insertion slot (not shown) of IC card reader 14.

In this manner, when USB memory 84 storing the IC card standard is mounted on image forming apparatus 22, CPU 70 of control unit 50 does not transmit the user information reading method data to data processing device 24 through LAN I/F 66 and network 20, but sets the IC card standard used by IC card reader 14 based on the IC card standard stored in USB memory 84. Therefore, even if communication between image forming apparatus 22 and data processing device 24 should fail because of some communication trouble, user authentication is possible if the registered user mounts USB memory 84 to image forming apparatus 22. Therefore, convenience for the user using image forming apparatus 22 can further be improved. Further, repetition of the same operations such as the data transmission/reception process in image forming apparatus 22 and determination and data transmission/reception processes in data processing device 24 can be saved. Therefore, load on the image forming apparatus 22 and data processing device 24 can be reduced.

[Modification]

A modification of user authentication system 10 has the same configuration as user authentication system 10 in the embodiment above, except that the user information reading method data stored in HDD 52 of image forming apparatus 22 and the management data stored in HDD 110 of data processing device 24 are different. In the present modification, components having the same functions as those of user authentication system 10 are denoted by the same reference characters and same names, and detailed description thereof will not be repeated.

<Hardware Configuration>

[Image Forming Apparatus 22]

HDD 52 stores in advance an identification ID of image forming apparatus 22, all IC card standards supported by IC card reader 14, and a network domain name of image forming apparatus 22, in relation to each other, as user information reading method data. Here, the network domain name of image forming apparatus 22 is group information indicating a group to which image forming apparatus 22 belongs. The network domain name is allotted individually for each department in a company or the like organized such that different departments are in charge of different kinds of work. The network domain name of image forming apparatus 22 is input through operation panel 54 by an administrator of image forming apparatus 22, for example, when image forming apparatus 22 is installed. Table 3 shows an example of user information reading method data.

TABLE 3

| IP address | IC card standard | Network domain name |
|---|---|---|
| 192.0.0.1 | Type-B | Domain a |

Referring to Table 3, in the present embodiment, an IP address "192.0.0.1" as an identification ID of image forming apparatus 22, Type-B as the IC card standard supported by IC card reader 14 and "Domain a" as the network domain name of image forming apparatus 22 are stored in relation to each other, in the form of a table. In the present specification, "Domain a" represents a network domain name allocated individually to a "Department of Management" of "Company A" organized such that different departments are in charge of different kinds of work. The registered user of image forming apparatus 22 belonging to "Domain a" is a company member who belongs to "Department of Management."

[Data Processing Device 24]

HDD 110 stores in advance the network domain name of image forming apparatus 22, and IC card standard usable by IC card 12 held by the user who is allowed to use image forming apparatus 22 belonging to the group to which the network domain name is allocated, in relation to each other as management data. Table 4 shows an example of management data.

TABLE 4

| Network domain name | IC card standard | | | |
|---|---|---|---|---|
| Domain a | Type-A | Type-B | ... | — |
| Domain b | Type-D | — | ... | — |
| ... | ... | ... | ... | ... |
| Domain n | Type-C | Type-E | ... | Type-Z |

Referring to Table 4, in the present embodiment, "Domain a" as the network domain name of image forming apparatus 22 and Type-A and Type-B as the IC card standards of IC card 12 held by company member of "Department of Management" as the registered user of image forming apparatus 22 belonging to the "Department of Management" to which "Domain a" is allocated are stored in relation to each other in the form of a table. Specifically, to the company member belonging to "Department of Management" as the registered user of image forming apparatus 22 belonging to "Department of Management," IC card 12 satisfying the IC card standard of Type-A or Type-B is handed out beforehand by an administrator or the like. Similarly, network domain names from Domain b to Domain n and IC card standards of IC cards 12 held only by registered users of image forming apparatuses 22 belonging to the groups having respective network domain names allocated thereto are stored in relation to each other.

<Software Configuration>
[Image Forming Apparatus 22 and Data Processing Device 24]

Computer programs stored in ROM 72 of image forming apparatus 22 and ROM 124 of data processing device 24 are programmed to control and operate the modification of user authentication system 10 as a whole, to enable its operation. The program for realizing the modification of user authentication system 10 in image forming apparatus 22 is the same as the program for realizing user authentication system 10 in the embodiment above. The program for realizing the modification of user authentication system 10 in data processing device 24 is the same as the program for realizing the user authentication system 10 in the embodiment above except for the process at step 301 (see FIG. 6) described above. In the following, the process of step 301 will be described.

Step 301 is executed if it is determined at step 300 that the user information reading method data is received (YES), and at this step, the management data stored beforehand in HDD 110 is read and, based on the read management data and the received user information reading method data, the IC card standard used by IC card reader 14 is decided. Specifically, at step 301, the management data and the user information reading method data are compared using the network domain name of image forming apparatus 22 as a key, and the matching IC card standard is decided to be the IC card standard used by IC card reader 14.

<Operation>

Image forming apparatus 22 to which IC card reader 14 is connected and data processing device 24 in accordance with the present modification operate in the following manner. In the present modification, the operations are the same as those of the embodiment above except for the operation of deciding the IC card standard used by IC card reader 14 when USB memory 84 is not mounted on image forming apparatus 22. Only the different operation will be described.

Determining that LAN I/F 118 has received the user information reading method data transmitted from image forming apparatus 22 connected thereto, CPU 122 of control unit 100 reads the management data stored in advance in HDD 110, and based on the read management data and the received user information reading method data, decides the IC card standard used by IC card reader 14. In the present embodiment, the management data (see Table 4) and the user information reading method data (see Table 3) are compared using "Domain a" as the network domain name of image forming apparatus 22 as a key, and of Type-A and Type-B as the IC card standards stored in relation to "Domain a" in the management data, Type-B, which is the IC card standard that matches the IC card standard supported by IC card reader 14 stored in user information reading method data, is decided to be the IC card standard used by IC card reader 14. As the management data and the user information reading method data are compared using the network domain name of image forming apparatus 22 as a key and the IC card standard is decided thereby, it is possible to change the IC card standard used for user authentication process by group to which the image forming apparatus 22 belongs. Therefore, it is possible to limit the users of image forming apparatus 22 group by group, for example, department by department. Therefore, it is possible to prevent a user from using an image forming apparatus 22 belonging to a group different from the group to which the user belongs, and hence, correct management of image forming apparatus 22 becomes possible. Further, security related to the use of image forming apparatus 22 can be enhanced. Further, a company member belonging to "Department of Management" as the group to which "Domain a" is allocated is authorized as a registered user of image forming apparatus 22 belonging to "Department of Management" if he/she uses IC card 12 handed out beforehand. Therefore, it becomes unnecessary to prepare different IC cards for each image forming apparatus 22. Therefore, convenience for the user using image forming apparatus 22 can further be improved.

The management data can be rewritten by an input operation from operating unit 114 by an administrator or the like of data processing device 24, and the user information reading method data can be rewritten by an input operation from operation panel 54 by an administrator or the like of image forming apparatus 22.

Assume, for example, that IC card 12 held by company member belonging to "Department of Management" as the registered user of image forming apparatus 22 belonging to "Department of Management" is changed and Type-A and Type-B as the IC card standards stored in relation to "Domain a" in the management data (see Table 4) are changed to Type-B and Type-C by, for example, an administrator of data processing device 24. Then, CPU 122 of control unit 100 decides the IC card standard used by IC card reader 14 in the following manner. Specifically, it compares the management data and the user information reading method data using "Domain a," which is the network domain name of image forming apparatus 22, as a key, and of Type-B and Type-C as the IC card standards stored in relation to "Domain a" in the management data, Type-B that is the IC card standard matching the IC card standard supported by IC card reader 14 stored in the user information reading method data is decided to be the IC card standard used by IC card reader 14.

<Functions/Effects>

The user authentication system 10 in accordance with the present embodiment and the modification thereof are directed to a user authentication system including a plurality of image forming apparatuses 22 including an IC card reader 14 for reading identification information for identifying a registered user from IC card 12, and a data processing device 24 performing data communication with the plurality of image forming apparatuses 22 through network 20. In image forming apparatus 22, HDD 52 stores in advance an identification ID unique to image forming apparatus 22, IC card standards supported by IC card reader 14, and installation site name of the image forming apparatus 22 or the network domain name to which image forming apparatus 22 belongs as limiting information limiting a registered user from among users, in relation to each other, as user information reading method data; LAN I/F 66 transmits the user information reading method data to data processing device 24 and receives a signal indicating the IC card standard used by IC card reader 14 from data processing device 24; user information management unit 68 sets the IC card standard used by IC card reader 14 based on the indicated IC card standard; the determining function of control unit 50 determines whether or not the user is a registered user depending on whether or not the identification information can be read by the set IC card standard, and the operation control function of control unit 50 sets, when the user is determined to be a registered user by the determining function, the image forming apparatus 22 to a state ready to use. In data processing device 24, HDD 110 stores in advance the installation site name of the image forming apparatus 22 or the network domain name of image forming apparatus 22 as the limiting information, and IC card standard usable by IC card 12 that is held only by the registered user, in relation to each other as management data; LAN I/F 118 receives the user information reading method data transmitted from image forming apparatus 22; the deciding function of control unit 100 decides the IC card standard used by IC card reader 14 based on the received user information reading method data and the management data; and LAN I/F 118 transmits a signal indicating the decided IC card standard to the image forming apparatus 22 having the corresponding identification ID.

In this manner, data processing device 24 capable of data communication with a plurality of image forming apparatuses 22 decides the IC card standard used by IC card reader 14 included in each image forming apparatus 22, and transmits a signal indicating the standard to image forming apparatus 22 having the corresponding identification ID. Image forming apparatus 22 sets the IC card standard used by IC card reader 14 based on the IC card standard decided by data processing device 24, and determines whether the user is a registered user or not. Therefore, it becomes unnecessary for an administrator or the like of image forming apparatus 22 to decide and set the IC card standard to be used by IC card reader 14 for each image forming apparatus 22. Therefore, the troublesome work of determining whether the user is a registered user or not can be saved. Further, as the IC card standard is automatically set, error in setting can be prevented, and the determination as to whether the user is a registered user or not can be made quickly and accurately. Further, data processing device 24 stores the management data required for deciding the IC card standard used by IC card reader 14 connected to image forming apparatus 22 and, therefore, it becomes unnecessary for each image forming apparatus 22 to store the management data in advance. Therefore, the load required for the storage in each image forming apparatus 22 can be reduced, and by one change to the management data, changes to all image forming apparatuses 22 can be made. Therefore, the user's trouble can further be saved.

Further, data processing device 24 decides the IC card standard used by IC card reader 14 based on the user information reading method data stored in advance including the identification ID unique to each image forming apparatus 22, the IC card standard supported by IC card reader 14 and the installation site name of image forming apparatus 22 or the network domain name to which the image forming apparatus 22 belongs as the limiting information for limiting the registered users from among users in relation to each other, and based on the management data stored in advance including the limiting information and the IC card standard usable only by the registered user in relation to each other. Therefore, decision can be made quickly and accurately. Thus, whether the user is a registered user or not can be determined quickly and accurately.

Further, in the present embodiment, when image forming apparatus 22 is activated, the program for realizing user authentication system 10 or its modification is activated. Therefore, even when at least the user information reading method data or the management data is changed, the IC card standard used by IC card reader 14 can be decided accurately. Therefore, the user authentication process can always be performed accurately. Further, even when at least the user information reading method data or the management data is changed, it is unnecessary for the administrator or the like of image forming apparatus 22 to decide and set the IC card standard used by IC card reader 14 for each and every image forming apparatus 22. Therefore, the trouble required for determining whether the user is a registered user or not can further be saved.

In the embodiment above, input of the management data is realized by an input operation through operating unit 114 and the input of user information reading method data is realized by an input operation through operation panel 54. The present invention, however, is not limited to such an embodiment. By way of example, such input may be realized by an input operation through an input device of an external device, such as a personal computer connected to network 20.

Further, in the embodiment above, the process for storing IC card standard in USB memory 84 at step 110 (see FIG. 4) is performed before the process for determining whether the user is a registered user or not. The present invention, however, is not limited to such an embodiment. By way of example, the process for storing may be performed simultaneously with the process for setting image forming apparatus 22 to a state ready to use and the process for displaying the setting image on the display unit of operation panel 54, at step 115 (see FIG. 4). Then, it follows that the IC card standard used for the user authentication process is stored only when the user of image forming apparatus 22 is a registered user. Therefore, security of use of the image forming apparatus 22 can further be improved. It is noted that the process of step 110 described above may not be performed in the present invention.

In the embodiment above, immediately after activation of image forming apparatus 22, the process for setting IC card standard based on the IC card standard stored in USB memory 84 of steps 101 to 103 (see FIG. 4) is performed. The present invention, however, is not limited to such an embodiment. By way of example, the process may be performed before starting the operation panel authentication process of step 107 (see FIG. 4). In that case, preferably, the operation panel authentication process is performed if it is determined that USB memory 84 is not connected, or if it is determined that USB memory 84 does not store the IC card standard. By such an approach, the IC card standard used by IC card reader 14 can be set based on the IC card standard decided by data processing device 24 in every process, except when a communication trouble occurs. Therefore, even when at least the user information reading method data or the management data is changed, the IC card standard used by IC card reader 14 can be decided accurately, and hence, the user authentication process can always be performed accurately. It is noted that the process of steps 101 to 103 described above may not be performed in the present invention.

Figure 7:
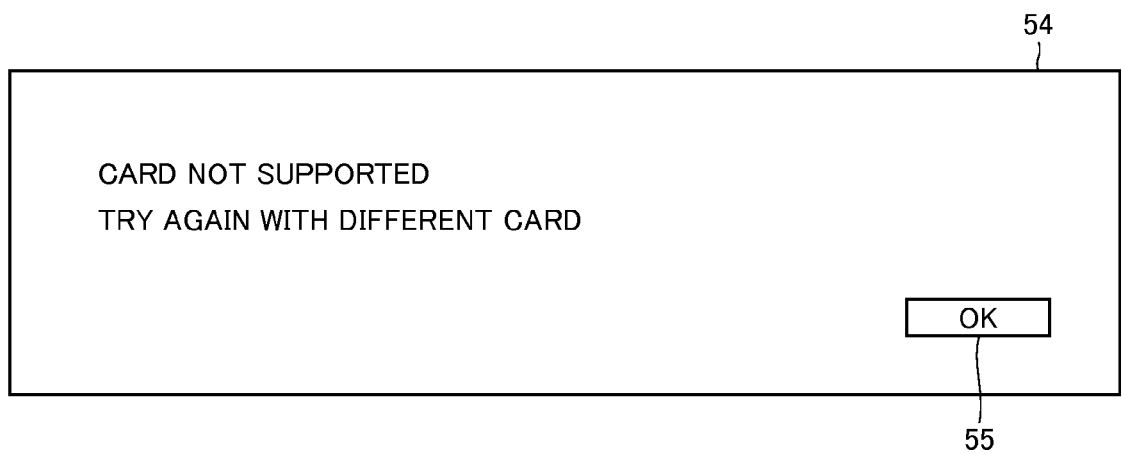
FIG. 7 shows an exemplary display on the operation panel.

Further, in the embodiment above, determination as to whether the user using IC card reader 14 is a registered user or not is made once. The present invention, however, is not limited to such an embodiment. By way of example, if the user is determined not to be the registered user in the determination mentioned above, the determination may be repeated for a predetermined number of times. In this manner, when the user is determined not to be a registered user, by performing the determination as to whether the user is a registered user or not for a predetermined number of times, erroneous determination can be prevented when, for example, IC card 12 is not properly inserted to the card insertion slot (not shown) of IC card reader 14. Therefore, more accurate user authentication process can be performed. In that case, desirably, a message such as "Card not supported. Try again using different card" in the example shown in FIG. 7 should be displayed on operation panel 54, asking the user to try again, every time the user is determined not to be the registered user. When the user re-inserts the card and makes an input operation on an OK button 55 after confirmation of such message, the determination process starts.

Further, in the embodiment above, if the user is determined to be a registered user in the user authentication process, image forming apparatus 22 is set to a state ready to use, and if the user is determined not to be the registered user, image forming apparatus 22 is kept in a state not ready to use. The present invention, however, is not limited to such an embodiment. By way of example, if the user is determined to be a registered user, the number of printed sheets may be counted site by site of installation of image forming apparatus 22 or group by group to which image forming apparatus 22 belongs, thereby to control status of use site by site of installation or group by group.

Further, in the embodiment above, IC card reader 14 is adapted to be connected to image forming apparatus 22. The present invention, however, is not limited to such an embodiment, and it may be provided as a built-in component.

Further, though LAN line is used as network 20 in the embodiment above, the present invention is not limited to such an embodiment and, by way of example, a wireless network may be used.

Further, though the operation panel authentication method is used when IC card authentication method is unavailable, the present invention is not limited to such an embodiment. By way of example, biometric authentication may be used. In that case, a biometric authentication device reading biometric information of the user such as a fingerprint or voice print and performing user authentication process based on the read biometric information is provided on image forming apparatus 22. The present invention may have a configuration in which authentication using a method other than the IC card authentication, such as the operation panel authentication, is not performed.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An authentication system including a plurality of terminals including an identification information reading device reading identification information for identifying a registered user, and a data processing device performing data communication with said plurality of terminals through a network; wherein said terminal includes first storage storing in advance an identification ID unique to said terminal, an identification information reading method supported by said identification information reading device, and limiting information for limiting said registered user from among users, related to each other as first data, a first transmitting device transmitting said first data to said data processing device, a first receiving device receiving a signal indicating said identification information reading method used by said identification information reading device, from said data processing device, a setting device setting said identification information reading method used by said identification information reading device, based on said indicated identification information reading method, a determining device determining whether or not a user is said registered user, based on whether or not said identification information can be read by said set identification information reading method, and a controller controlling an operation of said terminal based on the result of said determination; and said data processing device includes second storage storing in advance said limiting information and said identification information reading method usable only by said registered user, in relation with each other as second data, a second receiving device receiving said first data transmitted from said terminal, a deciding device deciding an identification information reading method used by said identification information reading device based on said received first data and said second data, and a second transmitting device transmitting a signal indicating said decided identification information reading method to said terminal having corresponding said identification ID.

2. The authentication system according to claim 1, wherein said first transmitting device transmits said first data to said data processing device, when said terminal is activated.

3. The authentication system according to claim 1, wherein said identification information reading device is an IC card reader reading identification information for identifying a registered user from an IC card;

said first storage includes a first storage unit storing in advance an identification ID unique to said terminal, an IC card standard supported by said IC card reader, and limiting information for limiting said registered user from among users, in relation to each other as first data;

said first receiving device includes a receiving unit receiving a signal indicating an IC card standard used by said IC card reader, from said data processing device;

said setting device includes a setting unit setting the IC card standard used by said IC card reader, based on said indicated IC card standard;

said determining device includes a determining unit determining whether or not a user is said registered user, based on whether said identification information can be read by said set IC card standard;

said second storage includes a second storage unit storing in advance said limiting information and an IC card standard usable by an IC card held only by said registered user, related to each other as second data;

said deciding device includes a deciding unit deciding the IC card standard used by said IC card reader, based on said received first data and said second data; and said second transmitting device includes a transmitting unit transmitting a signal indicating said decided IC card standard to said terminal having corresponding said identification ID.

4. The authentication system according to claim 1, wherein said terminal further includes a first input device allowing a user to input a password;

said first storage includes a storage unit storing in advance a password assigned only to said registered user; and said determining device includes a determining unit determining whether or not a user is said registered user, based on whether or not said password stored in advance in said storage unit matches the password input through said first input device.

5. The authentication system according to claim 4, wherein said determining unit determines, when said first transmitting device is incapable of transmitting said first data to said data processing device, or when said first receiving device does not receive the signal indicating the identification information reading method used by said identification information reading device from said data processing device, whether or not a user is a registered user based on whether or not said password stored in advance in said storage unit matches the password input through said first input device.

6. The authentication system according to claim 4, wherein said first input device includes an input unit allowing input of said first data; and
said data processing device further includes a second input device for inputting said second data.

7. The authentication system according to claim 1, wherein said limiting information is site information indicating a site where said terminal is installed.

8. The authentication system according to claim 1, wherein said limiting information is group information indicating a group to which said terminal belongs.

9. The authentication system according to claim 1, wherein said terminal includes a mounting unit formed to allow attachment/detachment of third storage storing said identification information reading method indicated by said second transmitting device; and
said setting device includes a setting unit setting, when said third storage is mounted on said mounting unit, the identification information reading method used by said identification information reading device, based on said identification information reading method stored in said third storage.

10. The authentication system according to claim 1, wherein
said terminal further includes a display device for displaying information to be indicated to a user; and
if it is determined by said determining device that the user is not said registered user, said display device displays that the user is not said registered user.

11. A terminal, comprising:
an identification information reading device which is an IC card reader that reads identification information from an IC card for identifying a registered user, and performs data communication with a data processing device deciding an IC card standard used by said identification information reading device through a network;
storage storing in advance an identification ID unique to said terminal, the IC card standard supported by said identification information reading device, and limiting information for limiting said registered user from among users, related to each other as data;
a transmitting device transmitting said data to said data processing device;
a receiving device receiving a signal indicating the IC card standard used by said identification information reading device, from said data processing device;
a setting device setting the IC card standard used by said identification information reading device, based on said indicated IC card standard;
a determining device determining whether a user is said registered user, based on whether or not said identification information can be read by said set IC card standard; and
a controller controlling an operation of said terminal based on the result of said determination.

12. The terminal according to claim 11, wherein
said transmitting device transmits said data to said data processing device, when said terminal is activated.

13. The terminal according to claim 11, wherein
said storage includes a storage unit storing in advance the identification ID unique to said terminal, the IC card standard supported by said IC card reader, and the limiting information for limiting said registered user from among users, in relation to each other as data;

said receiving device includes a receiving unit receiving the signal indicating the IC card standard used by said IC card reader, from said data processing device;
said setting device includes a setting unit setting the IC card standard used by said IC card reader, based on said indicated IC card standard; and
said determining device includes a determining unit determining whether or not the user is said registered user, based on whether said identification information can be read by said set IC card standard.

14. The terminal according to claim 11, further comprising
an input device allowing a user to input a password, and wherein
said storage includes a storage unit storing in advance a password assigned only to said registered user; and
said determining device includes a determining unit determining whether or not a user is said registered user, based on whether or not said password stored in advance in said storage unit matches the password input through said input device.

15. The terminal according to claim 14, wherein
said determining unit determines, when said transmitting device is incapable of transmitting said data to said data processing device, or when said receiving device does not receive the signal indicating the identification information reading method used by said identification information reading device from said data processing device, whether or not a user is a registered user based on whether or not said password stored in advance in said storage unit matches the password input through said input device.

16. The terminal according to claim 14, wherein
said input device includes an input unit allowing input of said data.

17. The terminal according to claim 11, wherein
said limiting information is site information indicating a site where said terminal is installed.

18. The terminal according to claim 11, wherein
said limiting information is group information indicating a group to which said terminal belongs.

19. The terminal according to claim 11, further comprising
a mounting unit formed to allow attachment/detachment of third storage storing said notified identification information reading method; and wherein
said setting device includes a setting unit setting, when said third storage is mounted on said mounting unit, the identification information reading method used by said identification information reading device, based on said identification information reading method stored in said third storage.

20. The terminal according to claim 11, further comprising
a display device for displaying information to be indicated to a user; and wherein
if it is determined by said determining device that the user is not said registered user, said display device displays that the user is not said registered user.

21. A terminal, used in an authentication system including the terminal and a data processing device performing data communication with said terminal through a network, comprising:

an identification information reading device reading identification information for identifying a registered user;

storage storing in advance an identification ID unique to said terminal, an identification information reading method supported by said identification information reading device, and key information for data collation, related to each other as first data; and a transmitting device transmitting said first data to said data processing device; wherein said data processing device determines the identification information reading method to be used by said identification information reading device, based on said received first data and on second data stored in advance containing said key information and the identification information reading method usable only by a registered user related to each other, and transmits a signal notifying said determined identification information reading method to said terminal having corresponding said identification ID;

said terminal further comprising:

a receiving device receiving said signal notifying said identification information reading method, from said data processing device;

a setting device setting the identification information reading method used by said identification information reading device, based on said indicated identification information reading method;

a determining device determining whether a user is said registered user, based on whether or not said identification information can be read by said set identification information reading method; and a controller controlling an operation of said terminal based on the result of said determination.

* * * * *